April 28, 1964     E. P. AGHNIDES     3,130,918
SLOTLESS AERATOR
Filed May 16, 1961

INVENTOR
Elie P. Aghnides
BY Moore & Hall,
ATTORNEYS

United States Patent Office 3,130,918
Patented Apr. 28, 1964

3,130,918
SLOTLESS AERATOR
Elie P. Aghnides, 46 W. 54th St., New York 19, N.Y.
Filed May 16, 1961, Ser. No. 110,547
7 Claims. (Cl. 239—431)

This invention relates to aerators and more particularly to the type in which there are no slots in the sidewall, but rather air enters the water outlet end of the device.

In the commercial aerators of the prior art, it was customary to have slots in the sidewalls through which air would enter. In my prior application, S.N. 135,645, filed December 29, 1949, entitled "Fluid Mixing Device," I illustrated an aerator in which air entered at the outlet end of the device rather than through slots in the sidewall. The description of those particular aerators was cancelled before that application issued into my U.S. Patent No. 2,811,340 granted October 29, 1957, however the subject matter thereof was carried forward into my prior copending application, S.N. 560,299, filed January 20, 1956, entitled "Fluid Mixing Device," now U.S. Patent No. 2,998,927 granted September 5, 1961. The present application illustrates certain improvements upon the devices of the earlier applications aforesaid.

The main object of the present invention is to simplify and lower the cost of the aerator and particularly that portion of the structure thereof which enables air to enter the outlet end of the device. Other objects and advantages of the invention will appear as this description proceeds.

In carrying out the foregoing objects, I employ an aerator structure having an upstream diaphragm directing high velocity streamlets of water upon a mixing surface in the path of the streamlets. The water is, however, confined to a limited area spaced inwardly from the inner wall of the casing by a cylindrical barrier which forms an air entranceway from the outlet end of the aerator to the mixing space. If desired, a mixing screen can be placed across the outlet end of the device and supported by the downstream end of the barrier.

Figure 1:
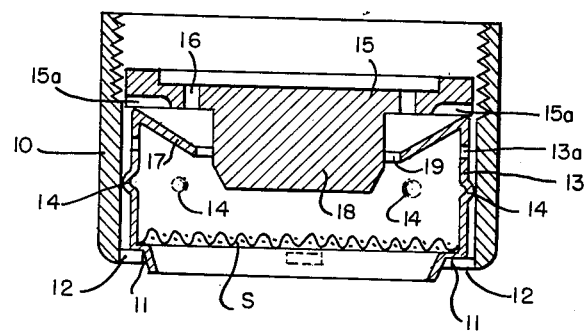
FIGURE 1 is a cross-sectional view of one form of the invention.

In FIGURE 1, the casing 10 has at its lower end inturned feet 11, having air passageways 12 between said feet. A cylindrical element 13 having a plurality of projections 14, to effect spacing from the inner sidewall of casing 10, supports the upstream disc 15 which has an annular row of water holes 16 therein. Integral with the cylindrical member 13 is a downwardly slanting element 17 which at its lower end is spaced from the projecting element 18 (which is integral with member 15), leaving a water outlet space 19. Screen S may be located across the outlet of the device and supported by member 13.

In operation, water is projected at high velocity from the holes 16 and is directed upon the inclined surface 17 where it is finely broken up and directed out of the annular hole 19. In view of the fact that the lower surface of member 15 has several spaced cutaway portions 15a, air entering the air inlet 12 may pass between members 10 and 13, through cutaway 15a, to the region immediately below holes 16, whereby the water striking member 17 is mixed with air before it passes out of holes 19. Air from inlet ports 12 may also pass through air inlet ports 13a to the region above screen S so that the water discharged from annular hole 19 upon the screen S is further finely broken up in the presence of air. As a result, the water is discharged from the outlet end of the device in the form of a coherent jet laden with numerous small bubbles. This stream of water has the same characteristics as the streamlets described in my aforesaid prior patents.

Figure 2:
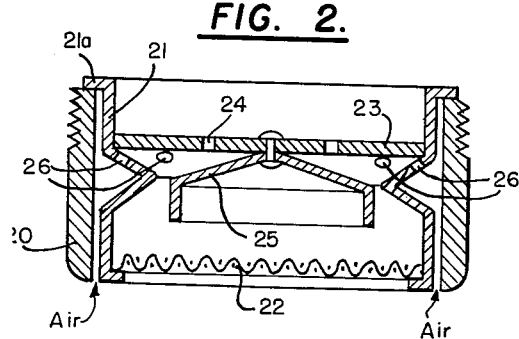
FIGURE 2 is a cross-sectional view of another form of the invention.

The device of FIGURE 2 employs a cylindrical casing 20 having internal shell 21 of soft plastic material. The upper edge of this shell has a lip 21a formed thereon which rests on top of the casing 20 and it has an inturned ledge at its lower edge supporting a screen 22. The shell 21 also supports the upstream disc 23 which has an annular row of orifices 24 that direct high velocity streamlets of water upon the conical surface 25. Air enters the space between members 20 and 21 and passes through holes 26 to the mixing space, so that the water striking surface 25 and the stream 22, is finely broken up in the presence of air, whereby the water discharged from the device is a coherent jet laden with numerous small bubbles, as aforesaid.

Figure 3:
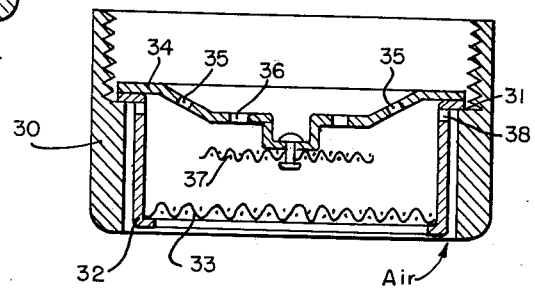
FIGURE 3 is a cross-sectional view of a still third form of the invention.

In FIGURE 3, the casing 30 has an internal ledge 31 which carries a cylindrical member 32, having an internal lip at its bottom that carries screen 33. An upstream disc 34 having an annular row of holes 35, rests upon member 32 and is composed of soft plastic material capable of acting as a washer. Hence when the device is installed upon a faucet the member 34 acts as a washer, in addition to providing an upstream disc for producing high velocity streamlets. Alternatively this member may be stamped from a metal sheet. The streamlets emerging from holes 35 are directed upon the inner wall of member 32 where the water is finely broken up in the presence of air as will appear later.

Another annular row of holes 36 directs streamlets of water upon screen 37. Air enters between members 30 and 32 and passes through holes 38 into the mixing space between diaphragm 34 on the one hand and surface 32, screen 33 and screen 37, on the other hand. The water striking surfaces 32, 33 and 37 is finely broken up in the presence of air and is discharged from the device as a coherent jet laden with numerous small bubbles as hereinabove explained in connection with the other figures.

This application is related to my prior applications, as follows: Serial No. 601,712, filed August 2, 1956, entitled "Fluid Mixing Device"; Serial No. 625,448, filed November 30, 1956, entitled "Improved Fluid Mixing Devices"; Serial No. 639,781, filed February 12, 1957, entitled "Automatically Adjustable Fluid Mixing Devices"; Serial No. 690,030, filed October 14, 1957, entitled "Water Aerator Diaphragms"; Serial No. 730,568, filed April 24, 1958, entitled "Framed Movable Screens for Use in Aerator Devices"; and Serial No. 84,616, filed January 24, 1961, entitled "Fluid Mixing Device," which is a continuation of my prior application Serial No. 351,907, filed April 29, 1953, entitled "Fluid Mixing Device."

I claim to have invented:

1. In a water aerator the combination comprising, an annular generally imperforate casing having threads adjacent its upstream end whereby it is adapted to be fastened to the discharge end of a water faucet, a perforate diaphragm, means for supporting said diaphragm upstream from the discharge end of said casing, a splash member, means for supporting said splash member downstream of and in fixed relationship to said diaphragm, said diaphragm having the axial direction of its perforation so oriented and said supporting means maintaining said splash member so positioned relative to said perforations that the high velocity streamlets issuing from said perforations impinge upon said splash surface, a depending annular skirt member extending at least in part below said splash surface, said casing having a horizontal portion, said skirt member having a flange carried by said horizontal portion for positioning said skirt member with its outer surface in spaced relation to the inner wall of said casing, said skirt member being spaced from and concentric with the inner wall of the casing and forming a path for the admission of air from the downstream end of said casing to the region between said diaphragm and said splash member, said skirt member supporting at least one mixing screen below said splash member, said diaphragm being supported by said skirt member, said casing having a horizontal portion and said positioning means comprising a flange carried by the skirt member, said skirt member depending from said flange.

2. An aerator comprising a casing having a threaded upstream portion for attaching the aerator to the faucet, said casing having a horizontal portion; jet forming and mixing means, including a flange resting on said horizontal portion of the casing for acting as the sole support for the jet forming said mixing means; and jet forming and mixing means including a jet forming diaphragm across the casing with a depending skirt concentric with and spaced from the inside wall of the casing, said jet forming and mixing means including a mixing element within the skirt and carried thereby, said skirt being limited above the mixing element to form an air path from the downstream end of the casing past the mixing element to the space between the diaphragm and the mixing element.

3. An aerator as defined in claim 2 in which said horizontal portion of the casing is the extreme top end of the casing.

4. An aerator as defined in claim 3 having another mixing element below and carried by the diaphragm and located above the first-named mixing element.

5. An aerator as defined in claim 2 in which said threads are inside the casing and said horizontal portion is just below the threads within the casing.

6. An aerator as defined in claim 5 in which there is a second mixing element located upstream the first-named one and carried by the diaphragm, said diaphragm including at least one jet forming orifice aimed at the second mixing element.

7. An aerator as defined in claim 6 in which the diaphragm has at least one jet forming orifice aimed at the inside wall of said skirt.

References Cited in the file of this patent

UNITED STATES PATENTS

| | | |
|---|---|---|
| 2,739,711 | Holden | Mar. 27, 1956 |
| 2,744,738 | Hjulian | May 8, 1956 |
| 2,799,487 | Aghnides | July 16, 1957 |
| 2,888,209 | Hjulian | May 26, 1959 |
| 2,989,249 | Richter | June 20, 1961 |
| 3,010,659 | Goodrie et al. | Nov. 28, 1961 |

FOREIGN PATENTS

| | | |
|---|---|---|
| 315,823 | Switzerland | Sept. 15, 1956 |

PO-1050
(5/69)

UNITED STATES PATENT OFFICE
CERTIFICATE OF CORRECTION

Patent No. 3,130,918            Dated  April 28, 1964

Inventor(s)  ELIE P. AGHNIDES

It is certified that error appears in the above-identified patent and that said Letters Patent are hereby corrected as shown below:

Claim 2, column 3, line 19, which now reads as follows: "the jet forming said mixing means; and jet forming and" should read, -- the jet forming and mixing means; said jet forming and --.

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents